US00RE39201E

(19) United States
(12) Reissued Patent
Kyler et al.

(10) Patent Number: US RE39,201 E
(45) Date of Reissued Patent: Jul. 18, 2006

(54) PAGEABLE FILTER DRIVER FOR PROSPECTIVE IMPLEMENTATION OF DISK SPACE QUOTAS

(75) Inventors: Daniel B. Kyler, Colorado Springs, CO (US); Najaf S. Husain, Great Falls, VA (US)

(73) Assignee: VERITAS Operating Corporation, Mountain View, CA (US)

(21) Appl. No.: 10/186,419

(22) Filed: Jul. 2, 2002

Related U.S. Patent Documents

Reissue of:
(64) Patent No.: 6,092,163
Issued: Jul. 18, 2000
Appl. No.: 09/205,066
Filed: Dec. 4, 1998

U.S. Applications:
(60) Provisional application No. 60/067,671, filed on Dec. 5, 1997.

(51) Int. Cl.
*G06F 12/00* (2006.01)

(52) U.S. Cl. ..... 711/163; 707/202; 707/205; 711/152

(58) Field of Classification Search ..... 707/202–205; 709/300–305; 711/147–151
See application file for complete search history.

(56) References Cited

U.S. PATENT DOCUMENTS 5,237,661 A * 8/1993 Kawamura et al. ..... 710/52
5,247,660 A * 9/1993 Ashcraft et al. ..... 707/205
5,421,011 A * 5/1995 Camillone et al. ..... 709/104
5,491,807 A * 2/1996 Freeman et al. ..... 711/1
5,574,952 A * 11/1996 Brady et al. ..... 710/68
5,634,050 A * 5/1997 Krueger et al. ..... 707/200
5,671,420 A * 9/1997 Bell et al. ..... 717/167
5,713,013 A * 1/1998 Black ..... 707/2
5,734,909 A 3/1998 Bennett
5,805,932 A * 9/1998 Kawashima et al. ..... 710/68
5,819,047 A * 10/1998 Bauer et al. ..... 709/229
5,946,686 A * 8/1999 Schmuck et al. ..... 707/10
5,956,734 A * 9/1999 Schmuck et al. ..... 707/205
6,000,009 A * 12/1999 Brady ..... 711/112
6,032,216 A * 2/2000 Schmuck et al. ..... 710/200

OTHER PUBLICATIONS

European Search Report dated Jul. 22, 2004; Ref. 3187–001PCT/EP; Application No. / Patent No. 99964066.7–1243–US9928595.

(Continued)

*Primary Examiner*—Christopher B. Shin
(74) *Attorney, Agent, or Firm*—Myertons Hood Kivlin Kowert & Goetzel, P.C.; B. Noël Kivlin; Rory D. Rankin

(57) ABSTRACT

A filter driver for implementing disk space quotas is described. Quota limits on disk space taken up by files in the file system are established for users and directories, and an internal database is established to track quotas against actual disk space utilization. A driver in accordance with the invention uses kernel resources of the operating system to prevent execution of file system I/O operations which would violate any established quota. In doing so, the driver executes a logic in kernel mode which serializes file allocation operations and also serializes access to the internal database. The first step in this logic is to intercept file system I/O requests before they reach the file system driver. Then the driver determines propectively—before the I/O request is completed—whether any quota would be exceeded by completion of the I/O request. If a quota would be exceeded, completion of the I/O request is blocked and an error status is issued. It a quota would not be exceeded, the I/O request is allowed to complete and the driver's internal database is updated with revised disk space utilization data.

8 Claims, 3 Drawing Sheets

OTHER PUBLICATIONS

"Disk Quota Management Priviliges"; IBM Technical Disclosure Bulletin, IBM Corp. New York, US, vol. 37, No. 4B, Apr. 1, 1994, p. 329, XP000451269; ISSN: 0018–8689, p. 329, line 4–line 6.

David Jones: "Introduction to the Internet, Remedy and Implement"; May 1, 1996, pp. 13–14, XP002284666; URL:http://wwwhome.cs.utwente.nl/{jansen/courses/unix_adm/study–guide/chap19/sec2p13.html; retrieved on Jun. 15, 2004.

David Jones: "An Introduction to Unix Systems Administration–Cron, Accounting, and Quotas"; Jan. 27, 1996, pp. 1–13; XP002284667; Retrieved from URL: http://wwhome.cs.utwente.nl/{jansen/courses/unix_adm/study–guide/textbook/chap16.html on Jun. 15, 2004.

* cited by examiner

PAGEABLE FILTER DRIVER FOR PROSPECTIVE IMPLEMENTATION OF DISK SPACE QUOTAS

Matter enclosed in heavy brackets [ ] appears in the original patent but forms no part of this reissue specification; matter printed in italics indicates the additions made by reissue.

This patent application is a continuation in part of provisional application 60/067,671 of the same title filed on Dec. 5, 1997.

BACKGROUND OF THE INVENTION

1. Field of the Invention

The present invention generally relates to devices for managing and controlling the allocation of disk space under an operating system, and more particularly to filter driver techniques for for implementing disk space quotas.

2. Background Description

Disk space quotas limit the amount of disk space that can be consumed by users on a system. Disk space is a resource that is necessary for proper system operation. In the absence of an enforceable disk space quota system, users are free to allocate as much disk space as they wish. This situation can interfere with system operation, as other users, as well as the operating system itself, may be unable to allocate disk space when it is needed. A disk space quota system allows system managers to set the maximum amount of disk space that each user may consume, ensuring that there will always be adequate space available for system operation.

While quota systems are implemented in many operating systems, some operating systems do not have quota systems or do not have robust quota functionality. For example, Windows NT (through version 4.0) does not provide a disk space quota system. Since Windows NT is increasingly being used in large multi-user server environments, it is necessary for third parties to provide this functionality. Some have attempted to provide this functionality using prior art techniques, but the methods they have used do not satisfactorily accomplish the goal of limiting disk space consumption by users.

For example, the prior art for implementing quotas under an operating system such as Windows NT version 4.0, where the operating system does not itself provide this functionality, relies upon the operating system's directory change notification mechanism to detect file allocation changes. Under this approach, if a quota is exceeded file protections are changed so that users may no longer create files in the directory to which the quota applies. This method is reactive; it detects changes after they have occurred, and has several disadvantages which limit its usefulness:

1. An appropriate status code cannot be returned. Changing file protections results in an "Access denied" status.
2. Absolute enforcement of quotas is not possible. The prior art method detects that a quota has already been exceeded. It does not fail an operation which would exceed a quota.
3. Files that are open cannot be affected. Once a user has opened a file he may extend it to the limit of available disk space, without being detected or prevented by the prior art method.

SUMMARY OF THE INVENTION

It is therefore an object of the present invention to implement disk space quotas in a manner which detects quota violations before they are written to disk.

A further object of the invention is to fail a disk I/O operation which would exceed a quota.

It is also an object of the invention to apply quotas to files which have been opened.

Another object of the invention is to use facilities available in the kernel of the operating system, including synchronization facilities.

A further object of the invention is to be implemented in pageable code.

The present invention is a filter driver for implementing disk space quotas. Quota limits on disk space taken up by filed in the file system are established for users and directories, and an internal database is established to track quotas against actual disk space utilization. A driver in accordance with the invention uses kernel resources of the operating system to prevent execution of file system I/O operations which would violate any established quota. In doing so, the driver executes a logic in kernel mode which serializes file allocation operations and also serializes access to the internal database.

The first step in this logic is to intercept file system I/O requests before they reach the file system driver. Then the driver determines prospectively—before the I/O request is completed—whether any quota would be exceeded by completion of the I/O request. If a quota would be exceeded, completion of the I/O request is blocked and an error status is issued. If a quota would not be exceeded, the I/O request is allowed to complete and the driver's internal database is updated with revised disk space utilization data.

The invention includes a file system filter driver that has the responsibility of monitoring disk space usage by users, and enforcing the quotas established by the system manager for each user. Quotas may also be established for directories where files are stored. The invention's file system filter driver intercepts every call bound for the file system driver and processes each of them with respect to their effect on disk space allocation in relation to the established quotas.

The invention keeps a persistent database of the established quotas and the amount of disk space used. This database is updated when file allocation changes, and it is used to store the quota information across system boots.

By using a file system filter driver to implement quotas, the invention is able to evaluate the effects of file system operations before the operation is actually executed. This allows the invention to enforce quotas in real time with a high degree of precision. Since the invention is in the actual I/O path, it can fail I/Os with the appropriate "Quota Exceeded" status code and can maintain an exact record of file allocation at any point in time.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
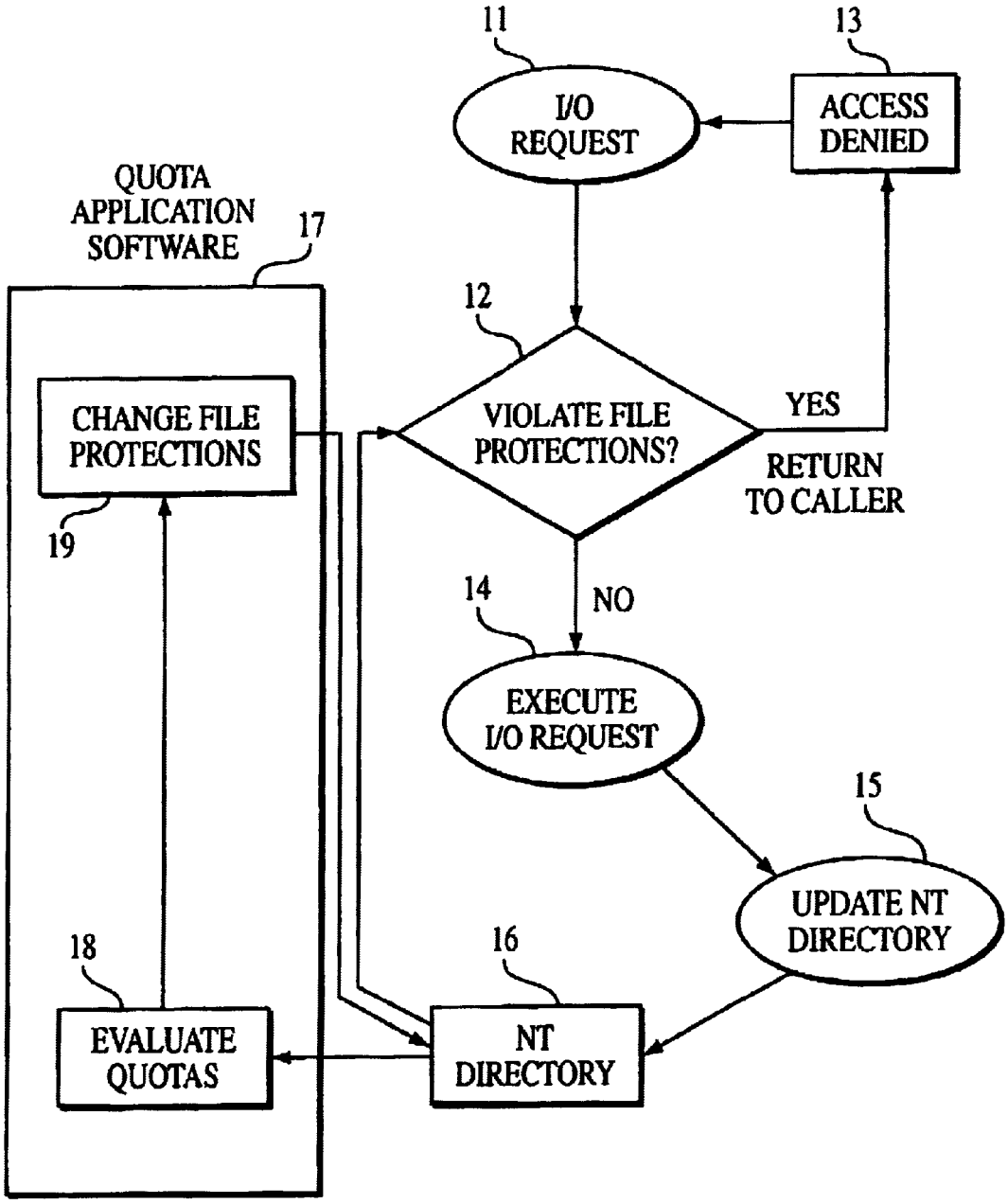
FIG. 1 (PRIOR ART)
FIG. 1 is a schematic of prior art techniques for implementing quotas.

Referring now to the drawings, and more particularly to FIG. 1, there is shown a prior art method of implementing quotas by monitoring changes to the file system directory. In the prior art a kernel process receives an I/O request 11 and checks the applicable file protections 12. If applicable file protections are violated the I/O request returns "Access Denied". If applicable file protections are not violated, the I/O request is completed 13 and the NT directory 16 is updated 15. The quota application software 17 detects that an I/O even affecting quotas has been executed and then evaluates 18 whether an affected file protection in NT directory 16 should be changed as a result of the I/O event. If an affected file protection should be changed the quota application software 17 then changes the file protections 19 in the NT directory 16. This in turn affects whether a subsequent I/O request will be executed.

In contrast to this prior art method, the present invention uses a file system filter to implement a quota system. A practical implementation of the invention can be described with reference to the Windows NT 4.0 operating system. See *Inside the Windows NT File System* by Helen Custer (Microsoft Press, 1994), which is incorporated herein by this reference, for a description of the environment within which the invention is implemented, in particular Chapter 2 which describes the layered driver model. The present invention is implemented to provide a quota system for Windows NT 4.0 as a filter driver on top of the NTFS Driver provided by Windows NT.

A file system filter is a kernel mode driver which intercepts file system I/O requests before they reach the file system driver, and may optionally specify a routine to be executed after the file system driver completes a request. File system drivers are old in the art and have been used for on-disk data encryption/decryption, file system performance monitoring, and other purposes.

Figure 2:
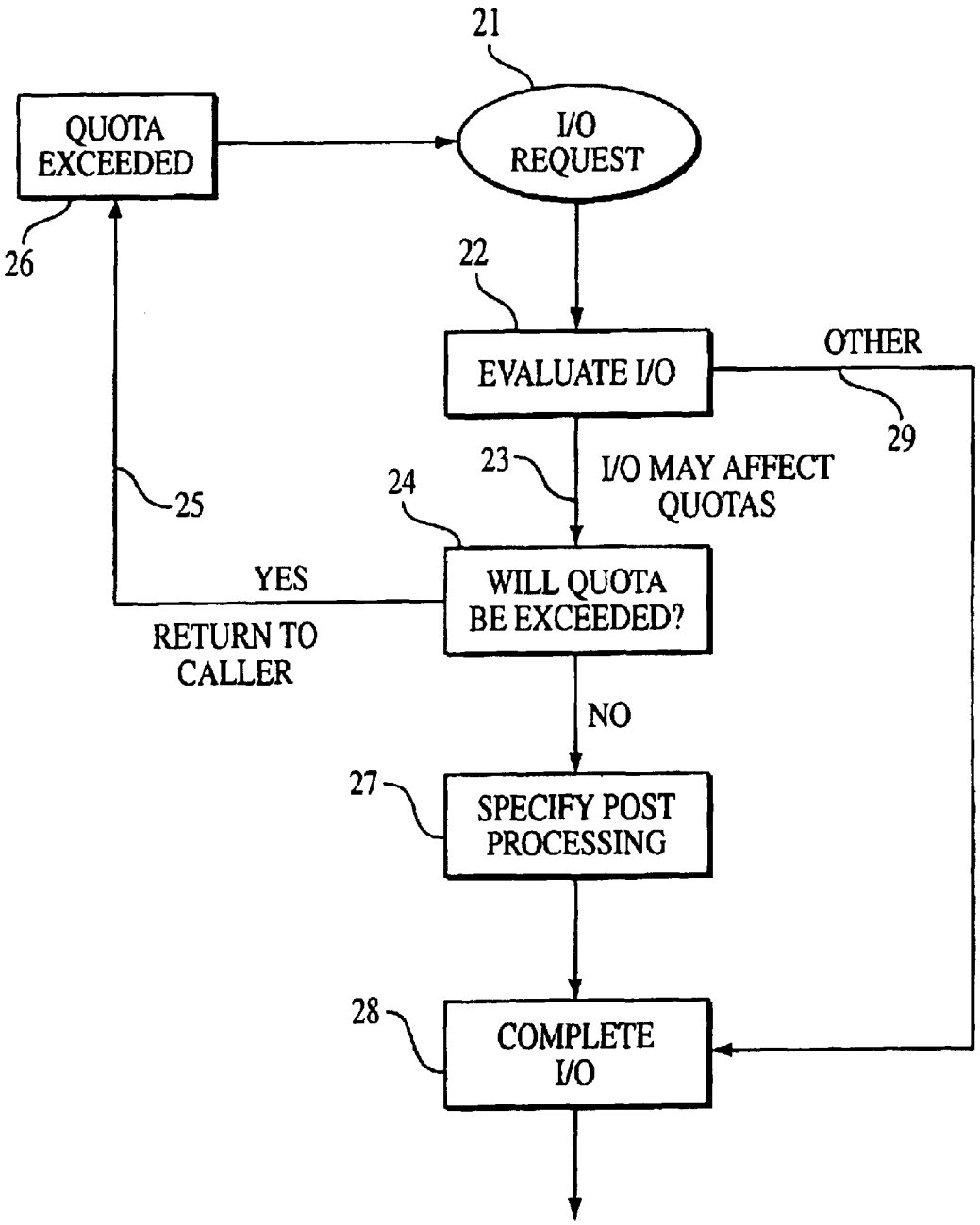
FIG. 2 is a flow chart for intercepting I/O requests in accordance with the invention.

Turning now to FIG. 2, when a file system driver in accordance with the invention (hereinafter called "QaFilter") receives a file system I/O request 21, it processes it based on the type of request. The I/O request is evaluated 22 to determine whether the request, if completed, would have an effect on a quota. Such requests (discussed below) cover file creation or open, write, change of file ownership, file renaming, and change of file compression status. If an I/O request 21 is one of these types 23, QaFilter determines—prospectively—how the various quotas would be affected if the I/O request were completed 24. If that determination 24 is that a quota would be exceeded, then the I/O request is failed and the routine returns to the caller 25 with an appropriate "Quota Exceeded" status code 26. If the determination 22 is that no quota would be exceeded, a post processing routine is specified 27 which will determine the actual effect of the operation on disk allocation, and the I/O request is completed 28. If an I/O request is determined at the evaluation step 22 to be not of a type which could have an effect on a quota 29, then it is completed 28.

Further detailes of how QaFilter operates with respect to I/O requests which may affect quotas will now be explained.

Create (Open)

A request to open a file causes QaFilter to create internal data structures (not shown) describing the file and the space currently allocated to the file. The allocation size of the file to be opened is retrieved from the file system and stored in the internal data structures so that the effect on file size of subsequent operations on the file can be accurately determined.

Write, Set Information (Extend or Truncate)

A write which extends beyond the current allocated space or a Set Information operation which changes the size of the file will affect the allocation size of the file on disk. QaFilter calculates the change the operation will have on file allocation. If the change would result in exceeding any applicable quota, the operation is failed immediately with "Quota Exceeded" status. If the change is permissible, a post processing routine is specified which will be executed after the file system has completed the request. The post processing routine examines the actual effect the operation had on disk space allocation for the file and updates the data structures for the file, both in memory and in the persistent database on disk.

Set Security (Change Owner)

Since many quotas are based on file ownership, changing the owner of a file can affect disk space allocation. When a request to change file ownership is received, it is examined to determine if it would put the new owner over his quota. If so, the request is failed immediately with "Quota Exceeded" status. If the change is permissible, a post processing route is specified which will be executed after the file system has completed the request. The post processing routine determines whether the file system successfully changed the file ownership, and if so, updates the in-memory data structures and the persistent database. The allocation size of the file is subtracted from the quota for the old owner, and added to the quota for the new owner.

Set Information (Rename)

Renaming a file can cause a change in quotas. A file may be renamed from one directory to another, which may change the quotas which apply to the directory where the file is located. Rename requests are intercepted, and they are examined to determine whether they have any effect on quotas. If the request would result in exceeding any applicable quota, it is failed immediately with a "Quota Exceeded" status. If the change is permissible, a post processing routine is specified which will execute after the file system has completed the request. The post processing routine examines the effects of the rename operation and updates the in-memory data structures and persistent database appropriately. The size of the renamed file (or multiple files in the case of a directory rename operation) is subtracted from any quotas which no longer apply, and added to any quotas which now apply, but previously did not.

File System Control (Set Compression)

Changing the compression status of a file will affect its allocation. When a compressed file is uncompressed, it may cause a user to exceed his quota. If this would be the case, the request is failed immediately with "Quota Exceeded" status. If the uncompress operation is permissible, or a file is being compressed, a post processing routine is specified which will execute after the file system has completed the request. The post processing routine determines the effect of the operation on disk space allocation and updates the in-memory data structures and the persistent database appropriately.

Cleanup

When a user closes his handle to a file, QaFilter receives Cleanup request. This causes QaFilter to eliminate any in-memory data structures for the file which are no longer needed.

Synchronization Issues

In order to accurately detect changes in file size, operations which might affect allocation must be serialized. In order to effect serialization, it is necessary to synchronize the operations which are related. In Windows NT, this can be accomplished through the use of a kernel event, which is one of the synchronization objects made available by the operating system. A kernel event is associated with each open file. A kernel event is in one of two states, signaled or non-signaled. Multiple processes can have a handle to a kernel event. When an operation which might affect file size is detected, the event for the file is cleared by QaFilter, i.e. reset to the non-signaled or locked state. While the event is locked, other operations on the file are blocked, waiting for the event to be signaled. The event is signaled in the post-processing routing for the operation which cleared the event, effectively serializing operations.

Additionally, QaFilter must serialize access to its internal data structures. This is done through the use of a single kernel mutex, which is another synchronization object made available by the Windows NT operating system. A mutex is useful in coordinating mutually exclusive access to a shared resource (thus the name "mutex"). Only one thread at a time can own a particular mutex. In order to access QaFilter's internal data structures, a thread must own a single kernel mutex. This mutex is in a signaled state when it is not owned by any thread, and is reset to a non-signaled or locked state by a thread which needs to access those data structures. While so locked, no other thread can access those data structures, thus serializing access.

Avoiding Recursive Operations

QaFilter must do file system I/O to acquire initial space used values and to update its database when necessary. This could cause recursive calls into QaFilter, resulting in deadlocks if a resource is held. To avoid this situation, the thread id of the thread which accesses the quota database, and of a thread created to do a file system scan, is recorded, and any I/O from those threads is ignored by QaFilter and passed directly to the file system driver.

Paging I/O

Paging I/O does not cause file allocation to change and is ignored. Ignoring paging I/O allows much of the driver's code to be pageable (incurring a page fault while processing a page fault causes a system crash), and improves performance by involving QaFilter only when necessary.

Retrieving Initial File Allocation

In some cases, e.g. when opening a file for overwrite access, QaFilter must retrieve the size of a file before the file is actually opened. Ordinarily, QaFilter gets the size of a file by doing an I/O against the file object which represents the user's handle to the file. However, before the file is opened, the file object does not represent a valid handle. In this case, QaFilter opens the file before the user's open is processed, getting it's own handle to the file. This handle is used to retrieve the allocation information. Then QaFilter's handle is closed, and the user's open request is allowed to proceed.

Renaming Directories

Renaming a directory which is subject to quotas presents special problems. When a directory is renamed, causing the set of quotas which apply to the directory to change, the sum of the allocation of all the files in that directory and all of it's subdirectories must be used to adjust the applicable quotas. This is a case where an operation on one file (the directory) affects many other files. When such an operation occurs, QaFilter calculates the allocation size for the entire directory by doing a "scan", the same operation which takes place when a new quota is created. This sum is subtracted from all quotas which previously applied to the directory and no longer do, and it is added to all new quotas for the directory.

Flushing on Cleanup

When the user closes his handle to a file, some data he has written may still be in cache. The size of a file may change when this data is committed to disk, particularly in the case of a compressed file, where the file allocation will decrease significantly when the data is written to disk. Since QaFilter can no longer effectively track the file after the user's handle is closed, it must force the data to be written to the disk at this point to get an accurate final file size. It does this by issuing a flush on the file object which represents the user's handle when a cleanup operation occurs. This causes the file size to be updated, and QaFilter can then retrieve an accurate allocation for quota calculations.

IROL Issues

Windows NT I/O post-processing routines may execute at DISPATCH_LEVEL (IRQL 2) or lower. This causes some complications for QaFilter, because many routines should not be called at DISPATCH_LEVEL. For example, taking a page fault or performing I/O at DISPATCH_LEVEL may cause a system crash. Since QaFilter must access pageable file system data structures and do I/O to retrieve file sizes and to update the quota database in I/O post-processing, practice of the invention requires a method to perform these operations without using DISPATCH_LEVEL.

Figure 3:
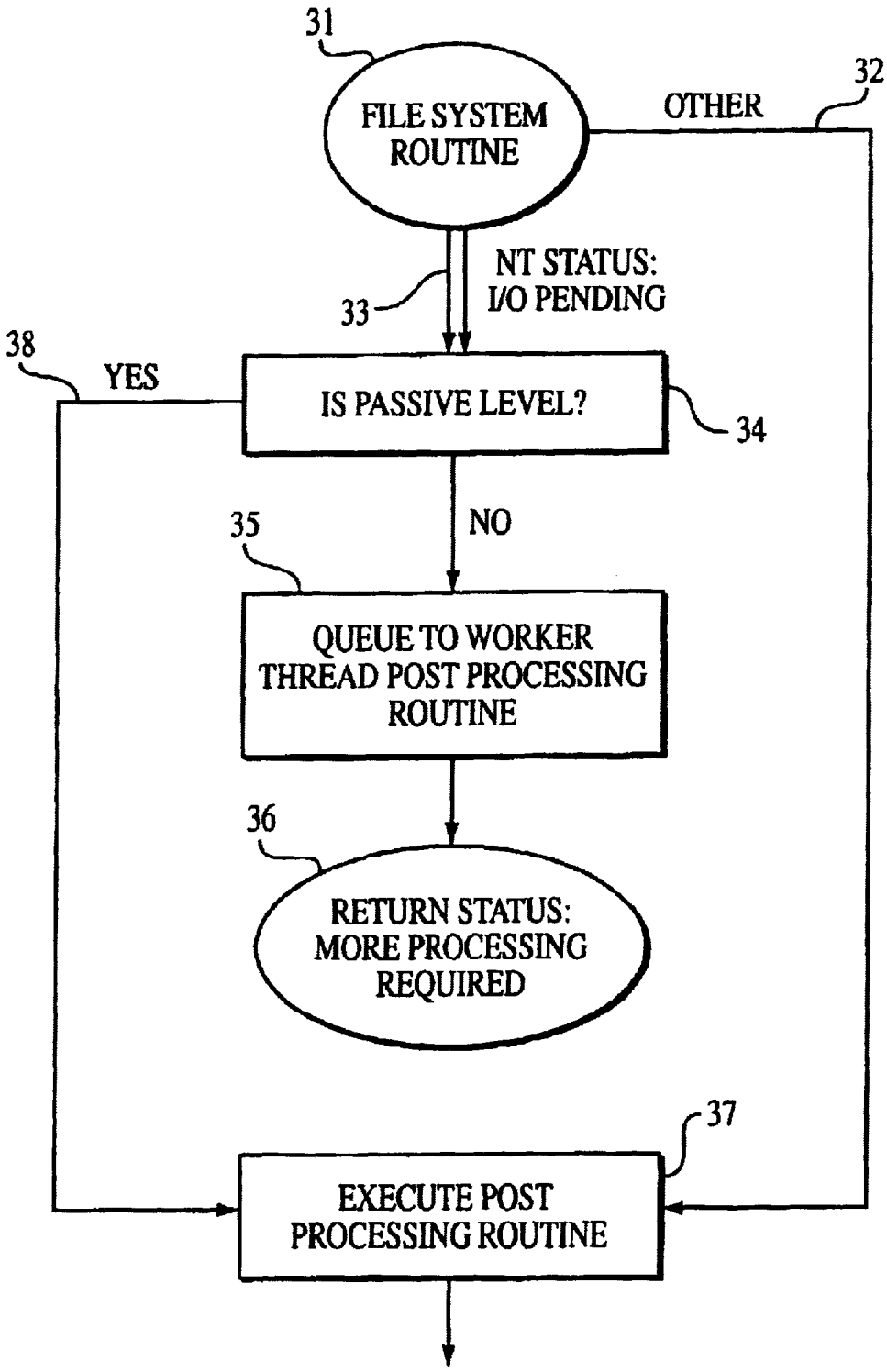
FIG. 3 is a flow chart for IRQL post processing in accordance with the invention.

Turning now to FIG. 3, if the filesystem's dispatch routine 31 returned a status other 32 than STATUS_PENDING 33, then the NT I/O completion routine does not do post-processing. Instead, it just returns STATUS_SUCCESS, and the post processing if performed by QaFilter's dispatch routine 37. This guarantees that the post-processing will be done at PASSIVE_LEVEL (IRQL 0).

If the filesystem's dispatch routine returned STATUS_PENDING 33, then QaFilter's dispatch routine has already returned, and the user's I/O may be asynchronous. This means QaFilter must do other work to guarantee executing the post-processing functions at PASSIVE_LEVEL. If the NT I/O completion routine is executing at PASSIVE_LEVEL (a determination made at block 34 in FIG. 3), then QaFilter's post-processing routine 37 is called directly 38, allowing for greatest performance. If the NT I/O completion routine is called at DISPATCH_LEVEL (a determination made at block 34 in FIG. 3), then QaFilter's post-processing routine is queued 35 to a pool of worker threads which execute at PASSIVE_LEVEL, and the I/O completion is delayed by returning 36 STATUS_MORE_PROCESSING_REQUIRED to the I/O Manager. When the worker thread has completed post-processing, it completes the I/O by calling IoCompleteRequest.

The best mode of implementing the features of the invention shown and described in connection with FIG. 3 is further detailed in the following Appendix, which sets forth the details in programming language which will be understood by those skilled in the art.

APPENDIX

```
NTSTATUS FASTCALL set_completion (
            PDEVICE_OBJECT                  device_object,
            PIRP                                  irp,
            PQA_COMPLETION_ROUTINE  routine,
            PQFCB                              qfcb)
{
        NTSTATUS                status =3D STATUS_SUCCESS;
        PDEVICE_OBJECT          target_device =3D NULL;
        PIO_STACK_LOCATION      irp_sp =3D NULL;
        PIO_STACK_LOCATION      irp_next_sp =3D NULL;
    PIRP_CONTEXT            irp_context =3D NULL;
    PFILE_OBJECT                file_obj;
    PAGED_CODE( );
```

APPENDIX-continued

```
    TraceEnter("set_completion");
        target_device =3D ((PFILTER_DEV_EXTENSION)
=device_object->DeviceExtension)->fs_device;
        irp_sp =3D IoGetCurrentIrpStackLocation (
                irp);
    file_obj =3D irp_sp->FileObject;
        irp_next_sp =3D IoGetNextIrpStackLocation (
                irp);
        irp_next_sp->MajorFunction =3D
irp_sp->MajorFunction;
        irp_next_sp->MinorFunction =3D
irp_sp->MinorFunction;
        irp_next_sp->Flags =3D irp_sp->Flags;
        irp_next_sp->Parameters =3D irp_sp->Parameters;
        irp_next_sp->FileObject =3D irp_sp->FileObject;
        irp_next_sp->DeviceObject =3D target_device;
    irp_context =3D create_irp_context (
                device_object,
                irp,
                qfcb);
    if (irp_context =3D=3D NULL)
    {
        return STATUS_INSUFFICIENT_RESOURCES;
    }
    irp_context->completion_routine =3D routine;
        IoSetCompletionRoutine (
                irp,
                post_process,
                irp_context,
                TRUE,
                TRUE,
                TRUE);
        status =3D IoCallDriver (
                target_device,
                irp);
        if (status !=3D STATUS_PENDING)
        {
            (VOID) (*routine) (
                irp_context);
            free irp_context (
                irp_context);
        }
        return status;
}
NTSTATUS post_process (
            PDEVICE_OBJECT devobj,
            PIRP    irp,
            PIRP_CONTEXT    irp_context)
{
    NTSTATUS        status =3D STATUS SUCCESS;
    PIO_STACK_LOCATION          irp_sp =3D
IoGetCurrentIrpStackLocation(irp);
    PSID        owner =3D NULL;
    PQSEC_DESC    sd =3D NULL;
        //
        //    If IoCallDriver returned PENDING, mark our
        //    stack location with pending.
        //
    irp_context->io_status =3D irp->IoStatus.Status;
    irp_context->io info =3D irp->IoStatus_Information;
    if (!irp->PendingReturned)
    {
        return STATUS_SUCCESS;
    }
    IoMarkIrpPending( irp );
    if (KeGetCurrentIrql ( ) =3D=3D PASSIVE_LEVEL)
    {
        status =3D (*irp_context->completion routine) (
                irp_context);
        free_irp_context (
            irp_context);
        return status;
    }
    else
    {
        ExInitializeWorkItem (
                &irp_context->work_item,
                work_post,
                irp_context);
```

APPENDIX-continued

```
        QaQueueWorkItem (
                &irp_context->work_item,
                CriticalWorkQueue);
        return STATUS_MORE_PROCESSING_REQUIRED;
    }
}
VOID work_post (
            PIRP_CONTEXT    irp_context)
{
    PAGED_CODE( );
    (*irp_context->completion_routine) (
                irp_context);
    IoCompleteRequest (
            irp_context->irp,
            IO_NO_INCREMENT);
    free_irp_context (
            irp_context);
    return;
}
NTSTATUS FASTCALL synchronous_completion (
            PDEVICE_OBJECT              device_object,
            PIRP                        irp,
            PQA_COMPLETION_ROUTINE routine,
            PQFCB                       qfcb)
{
        NTSTATUS            status =3D STATUS_SUCCESS;
        NTSTATUS            io_call_status =3D
                            STATUS_SUCCESS;
        PDEVICE_OBJECT              target_device =3D NULL;
        PIO_STACK_LOCATION          irp_sp =3D NULL;
        PIO_STACK_LOCATION          irp_next_sp =3D NULL;
    PIRP_CONTEXT            irp_context =3D NULL;
    PFILE_OBJECT            file_obj;
    PAGED_CODE( );
    TraceEnter("set_completion");
        target device =3D ((PFILTER_DEV_EXTENSION)
=device_object->DeviceExtension) ->fs_device;
        irp_sp =3D IoGetCurrentIrpStackLocation (
                irp);
    file_obj =3D irp_sp->FileObject;
        irp_next_sp =3D IoGetNextIrpStackLocation (
                irp);
        irp_next_sp->MajorFunction =3D
irp_sp->MajorFunction;
        irp_next_sp->MinorFunction =3D
irp_sp->MinorFunction;
        irp_next_sp->Flags =3D irp_sp->Flags;
        irp_next_sp->Parameters =3D irp_sp->Parameters;
        irp_next_sp->FileObject =3D irp_sp->FileObject;
        irp_next_sp->DeviceObject =3D target_device;
    irp_context =3D create_irp_context (
                device_object,
                irp,
                qfcb);
    if (irp_context =3D=3D NULL)
    {
        return STATUS_INSUFFICIENT_RESOURCES;
    }
    irp_context->completion_routine =3D routine;
    KeInitializeEvent (
            &irp_context->event,
            NotificationEvent,
                FALSE);
        IoSetCompletionRoutine (
                irp,
                synch_post,
                irp_context,
                TRUE,
                TRUE,
                TRUE);
        io_call_status =3D IoCallDriver (
                target_device,
                irp);
        KeWaitForSingleObject (
                &irp_context->event,
                Executive,
                KernelMode,
                FALSE,
                NULL);
```

APPENDIX-continued

```
        status =3D (*routine) (
                irp__context);
        ASSERT(status =3D=3D STATUS__SUCCESS);
        free__irp__context (
                irp__context);
            return io__call__status;
}
NTSTATUS synch__post (
                PDEVICE__OBJECT devobj,
                PIRP        irp,
                PIRP__CONTEXT irp__context)
{
        //
        // If IoCallDriver returned PENDING, mark our
// stack location with pending.
        //
    if (irp->PendingReturned)
    {
        IoMarkIrpPending( irp );
    }
    irp__context->io__status =3D irp->IoStatus.Status;
    irp__context->io__info =3D irp->IoStatus.Information;
    KeSetEvent (
                &irp__context->event,
                0,
                FALSE);
    return STATUS__SUCCESS;
}
```

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A filter driver for use with an operating system, comprising:

[means for establishing disk space quotas, said quotas being established in relation to a plurality of quota parameters;]

means for determining disk space utilization in relation to [each of said quota parameters] *a plurality of disk space quotas*;

means for storing said disk space quotas and said disk space utilization in a file structure;

means for monitoring disk I/O;

means for prospectively evaluating the effect of said disk I/O on said disk space utilization, said effect being a revised disk space utilization in relation to said disk space quotas;

means for terminating said disk I/O if said revised disk space utilization exceeds any of said disk space quotas; and means for updating said file structure to reflect completion of said disk I/O if said revised disk space utilization does not exceed any of said disk space quotas.

2. The filter driver of claim 1, wherein said monitoring means further comprises:

means for detecting disk I/O operations, each said disk I/O operation being associated with a named disk file;

means for serializing operations on said named disk file.

3. The filter driver of claim 2, wherein said serializing means further comprises:

means for locking a synchronizing object, said synchronizing object being associated with said named disk file, and said locking means serving to block further disk I/O operations on said named disk file.

4. The filter driver of claim 3, wherein said synchronizing object is a kernel event in the Windows NT operating system.

5. The filter driver of claim 1, wherein said plurality of quota parameters comprise one or more ownership quotas and one or more directory quotas, each said ownership quota being a maximum quantity of said disk space in use by files associated with a particular owner, and each said directory quota being a maximum quantity of said disk space in use by files associated with a particular directory.

6. The filter driver of claim 1, wherein access to said file structure is serialized.

7. The filter driver of claim 1, wherein said monitoring means ignores paging I/O.

8. The filter driver of claim 1, wherein said prospective evaluation means further comprises:

means for determining said revised disk space utilization; and means for comparing said revised disk space utilization to said disk space quotas.

* * * * *